US012574549B2

(12) United States Patent (10) Patent No.: US 12,574,549 B2
Li et al. (45) Date of Patent: Mar. 10, 2026

(54) CHROMA INTRA PREDICTION WITH FILTERING

(71) Applicant: GOOGLE LLC, Mountain View, CA (US)

(72) Inventors: Xiang Li, Saratoga, CA (US); Debargha Mukherjee, Cupertino, CA (US); Yaowu Xu, Saratoga, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/901,214

(22) Filed: Sep. 30, 2024

(65) Prior Publication Data

US 2025/0119577 A1 Apr. 10, 2025

Related U.S. Application Data

(60) Provisional application No. 63/542,592, filed on Oct. 5, 2023.

(51) Int. Cl.
H04N 19/593 (2014.01)
H04N 19/11 (2014.01)
(Continued)

(52) U.S. Cl.
CPC .......... H04N 19/593 (2014.11); H04N 19/11 (2014.11); H04N 19/117 (2014.11);
(Continued)

(58) Field of Classification Search
CPC .... H04N 19/593; H04N 19/11; H04N 19/117; H04N 19/119; H04N 19/136; H04N 19/176; H04N 19/184; H04N 19/186
See application file for complete search history.

(56) References Cited

U.S. PATENT DOCUMENTS

2023/0043350 A1* 2/2023 Choe .................... H04N 19/593

FOREIGN PATENT DOCUMENTS

EP 3941046 A1 * 1/2022 ............. H04N 19/96

OTHER PUBLICATIONS

JVET-Z0064 (Year: 2022).*
JVET-Z0100 (Year: 2022).*
JVET-AA0153 (Year: 2022).*

* cited by examiner

*Primary Examiner* — Shadan E Haghani
(74) *Attorney, Agent, or Firm* — Young Basile Hanlon & MacFarlane, P.C.

(57) ABSTRACT

Encoding using chroma intra prediction with filtering includes encoding a current block from a current frame, which includes obtaining a first chroma prediction value for a current chroma pixel using a current spatial intra prediction mode, obtaining a current luma prediction value for a current luma pixel collocated with the current chroma pixel, obtaining a second chroma prediction value for the current chroma pixel for the current chroma component by applying derived filter coefficients to the current luma prediction value, obtaining, as a third chroma prediction value for the current chroma pixel for the current chroma component, a weighted average of the first chroma prediction value and the second chroma prediction value, obtaining encoded chroma pixel data for the current chroma pixel by encoding the current chroma pixel using the third chroma prediction value, and including the encoded chroma pixel data in the encoded block data.

20 Claims, 13 Drawing Sheets

(51) Int. Cl.

| | |
|---|---|
| *H04N 19/117* | (2014.01) |
| *H04N 19/119* | (2014.01) |
| *H04N 19/136* | (2014.01) |
| *H04N 19/176* | (2014.01) |
| *H04N 19/184* | (2014.01) |
| *H04N 19/186* | (2014.01) |

(52) U.S. Cl.

CPC ......... *H04N 19/119* (2014.11); *H04N 19/136* (2014.11); *H04N 19/176* (2014.11); *H04N 19/184* (2014.11); *H04N 19/186* (2014.11)

500

N×N CHROMA
BLOCK
810

2N×2N LUMA
BLOCK
820

1000

1300

OBTAIN ENCODED BITSTREAM ~1310

1380

OBTAIN CURRENT BLOCK ~1320

OBTAIN CURRENT DECODED BLOCK DATA ~1330

1370

OBTAIN CURRENT COMPONENT ~1350

1364

OBTAIN CURRENT PIXEL ~1352

OBTAIN FIRST CHROMA PREDICTION DATA ~1354

OBTAIN FIRST LUMA PREDICTION DATA ~1356

OBTAIN SECOND CHROMA PREDICTION DATA ~1358

OBTAIN THIRD CHROMA PREDICTION DATA ~1360

OBTAIN DECODED CHROMA PIXEL DATA ~1362

OUTPUT ~1340

CHROMA INTRA PREDICTION WITH FILTERING

CROSS-REFERENCE TO RELATED APPLICATION(S)

This application claims priority to and the benefit of U.S. Provisional Application Patent Ser. No. 63/542,592, filed Oct. 5, 2023, the entire disclosure of which is hereby incorporated by reference.

BACKGROUND

Digital images and video can be used, for example, on the internet, for remote business meetings via video conferencing, high-definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth.

SUMMARY

This application relates to encoding and decoding of image data, video stream data, or both for transmission, storage, or both. Disclosed herein are aspects of systems, methods, and apparatuses for encoding and decoding using chroma intra prediction with filtering.

Variations in these and other aspects will be described in additional detail hereafter.

An aspect is a method for decoding using chroma intra prediction with filtering. Decoding using chroma intra prediction with filtering includes generating encoded block data by encoding a current block from a current frame. Encoding the current block may include obtaining a first chroma prediction value for a current chroma pixel for a current chroma block of a current chroma component from the current block using a current spatial intra prediction mode other than a cross-component intra prediction mode, obtaining a current luma prediction value for a current luma pixel collocated with the current chroma pixel using the current spatial intra prediction mode, obtaining a second chroma prediction value for the current chroma pixel for the current chroma component by applying derived filter coefficients to the current luma prediction value, obtaining, as a third chroma prediction value for the current chroma pixel for the current chroma component, a weighted average of the first chroma prediction value and the second chroma prediction value, obtaining encoded chroma pixel data for the current chroma pixel by encoding the current chroma pixel using the third chroma prediction value, and including the encoded chroma pixel data in the encoded block data. The method may include including the encoded block data in an encoded bitstream and outputting the encoded bitstream.

An aspect is an apparatus for decoding using chroma intra prediction with filtering.

An aspect is a computer readable medium including an encoded bitstream for decoding, the encoded bitstream encoded using chroma intra prediction with filtering.

An aspect is a method for encoding using chroma intra prediction with filtering. Encoding using chroma intra prediction with filtering may include generating encoded block data by encoding a current block from a current frame, including the encoded block data in an encoded bitstream, and outputting the encoded bitstream. Encoding the current block may include obtaining a first chroma prediction value for a current chroma pixel for a current chroma block of a current chroma component from the current block using a current spatial intra prediction mode other than a cross-component intra prediction mode, obtaining a current luma prediction value for a current luma pixel collocated with the current chroma pixel using the current spatial intra prediction mode, obtaining a second chroma prediction value for the current chroma pixel for the current chroma component by applying derived filter coefficients to the current luma prediction value, obtaining, as a third chroma prediction value for the current chroma pixel for the current chroma component, a weighted average of the first chroma prediction value and the second chroma prediction value, obtaining encoded chroma pixel data for the current chroma pixel by encoding the current chroma pixel using the third chroma prediction value, and including the encoded chroma pixel data in the encoded block data.

An aspect is an apparatus for encoding using chroma intra prediction with filtering.

An aspect is a computer readable medium including an encoded bitstream encoded using chroma intra prediction with filtering.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients (e.g., energy compaction), quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to reconstruct the blocks and the source images from the limited information. In some implementations, the accuracy, efficiency, or both, of coding a block using either inter-prediction or intra-prediction may be limited.

The encoding and decoding using chroma intra prediction with filtering described herein improves on video coding techniques, or codecs, by using spatial intra prediction modes with filtering, which improves coding efficiency relative to using spatial intra prediction modes in the absence of filtering, by removing redundancy between color components.

Figure 1:
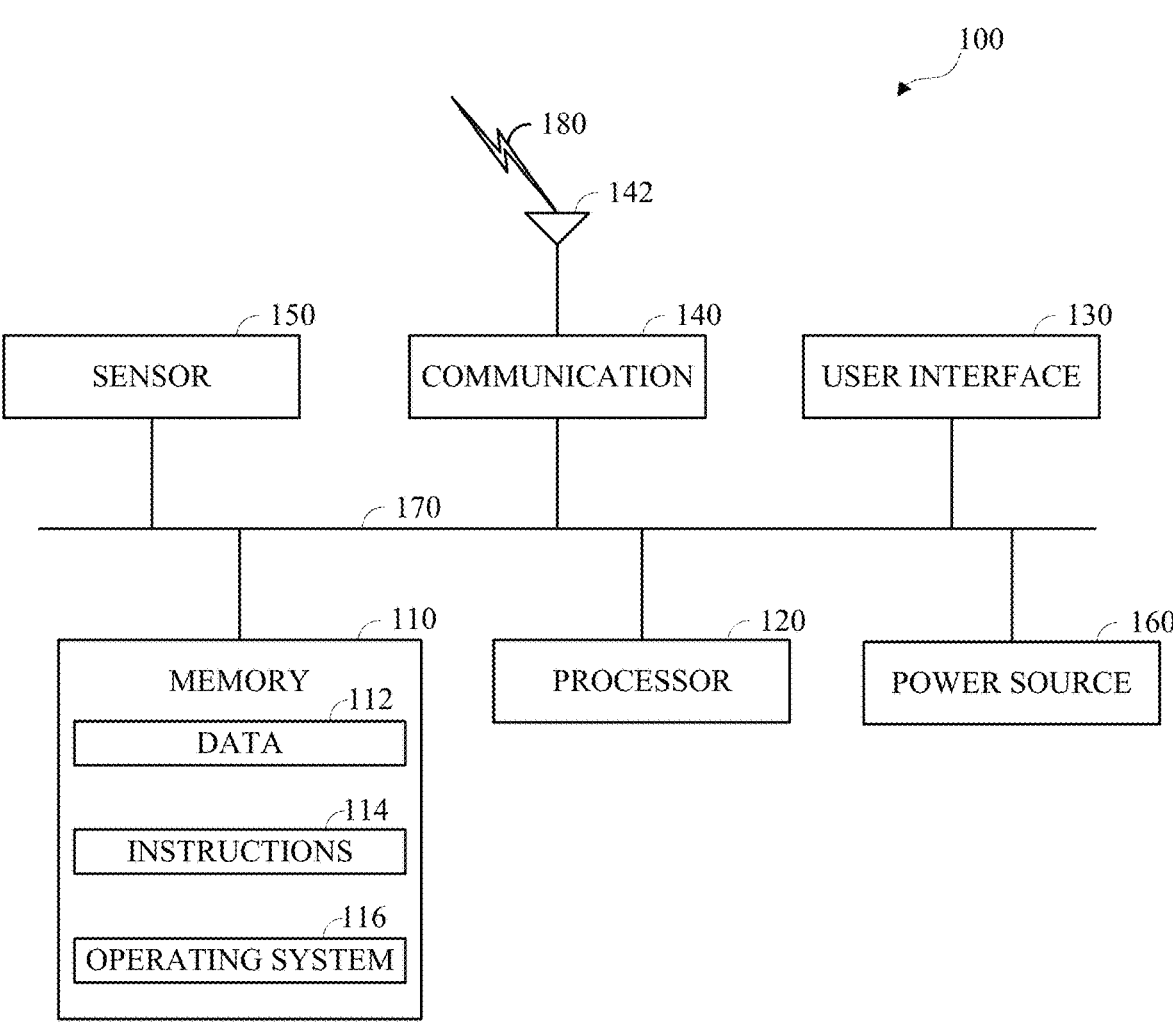
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, which may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
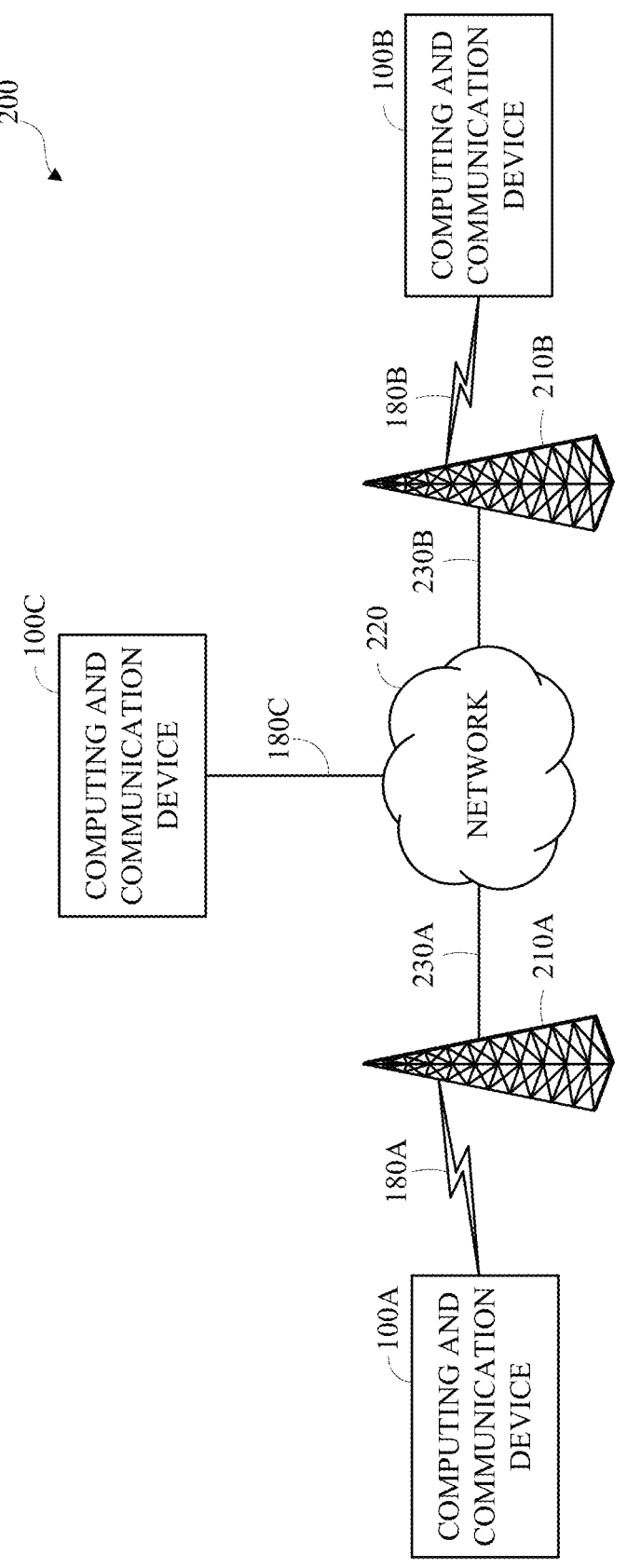
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some, or all, of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VOIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
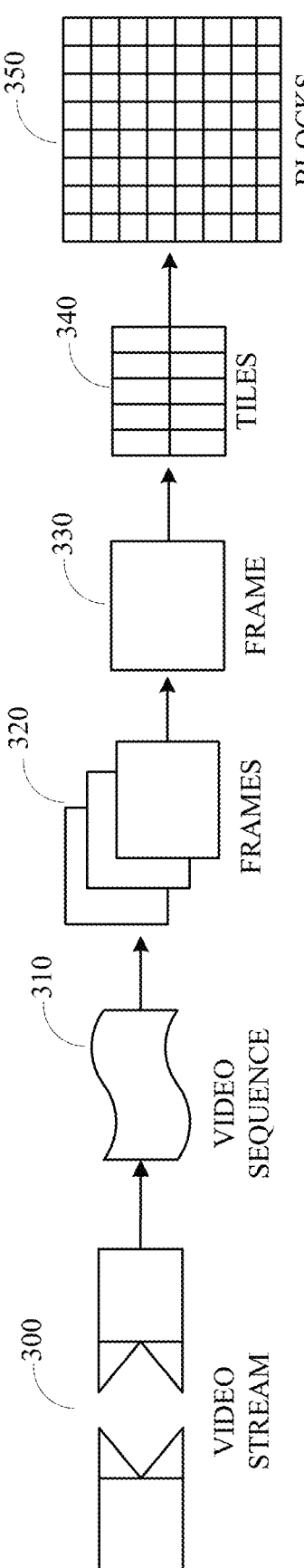
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
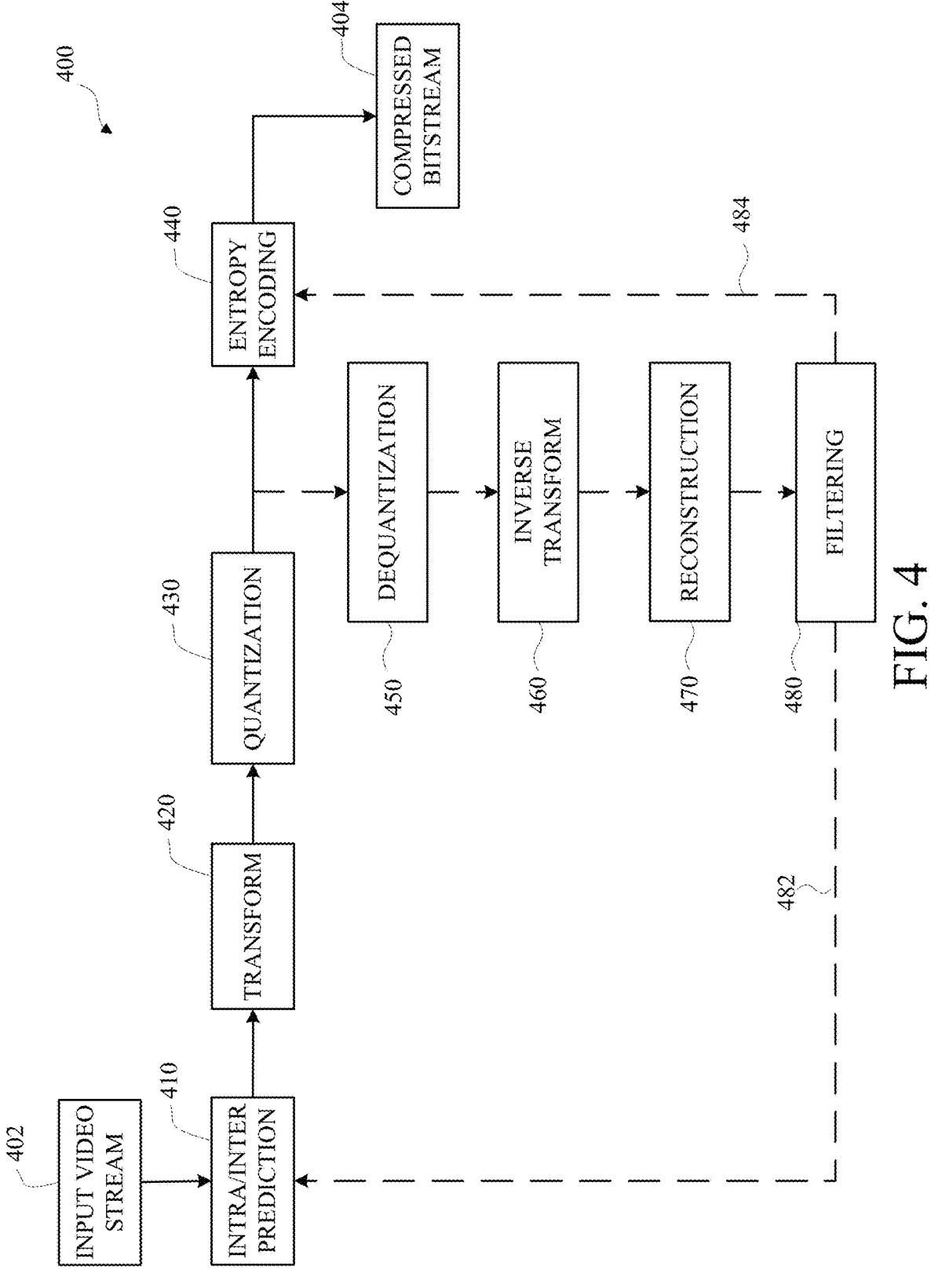
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e., DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
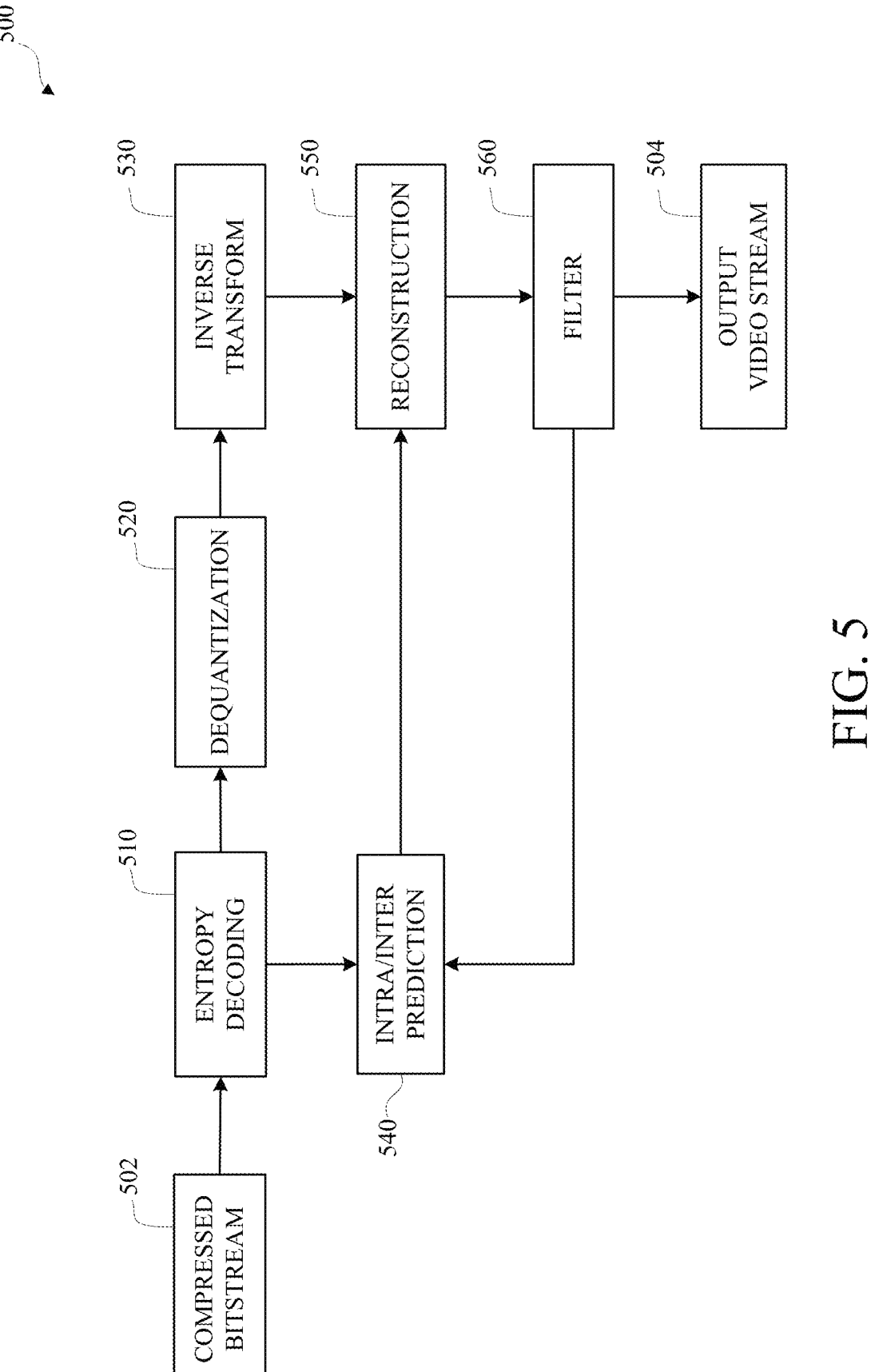
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 560.

Figure 6:
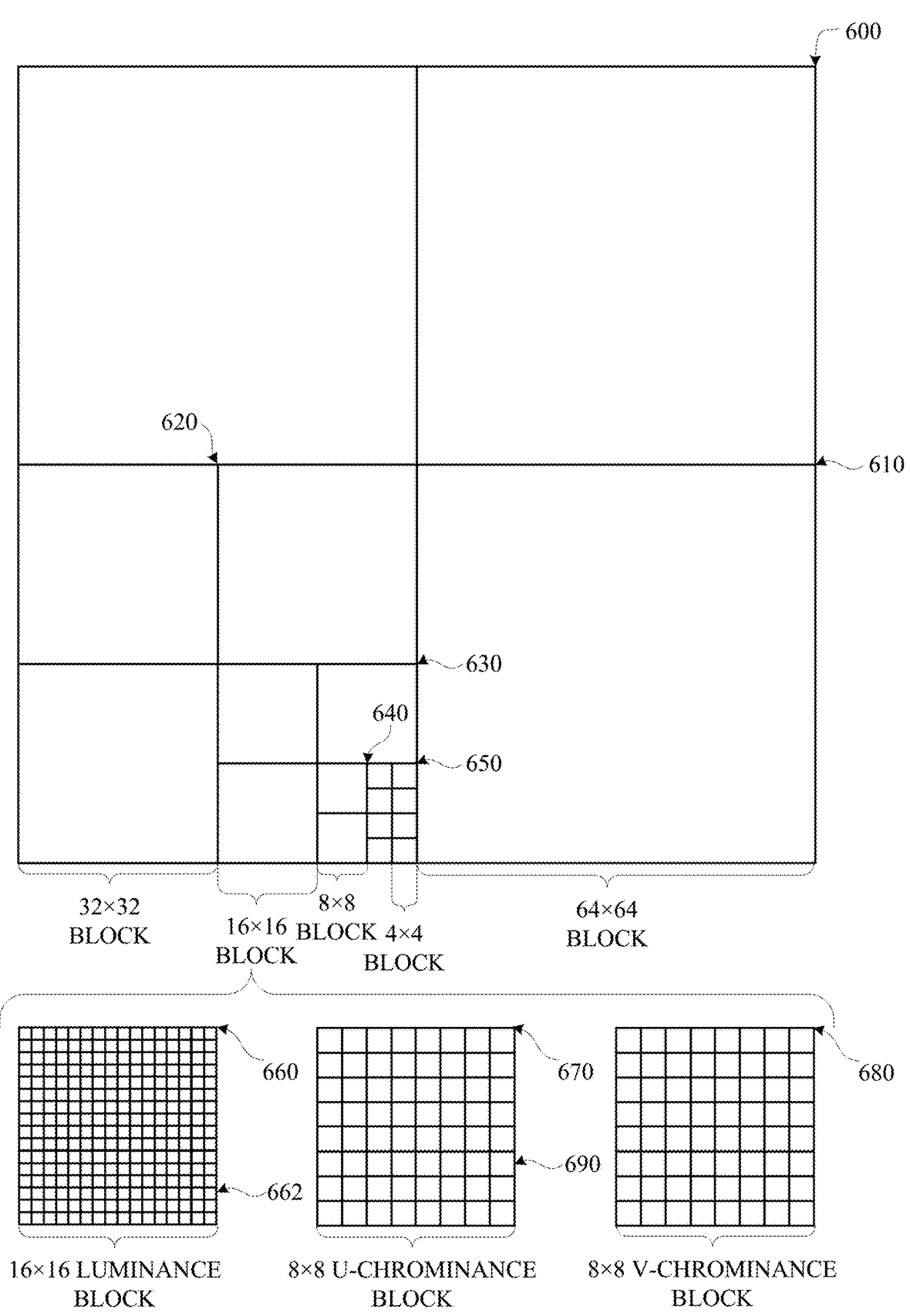
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as fx, y. Similarly, a pixel of the search area of the reference frame may be indicated based on location using Cartesian coordinates as I'x, y. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding, such as video coding using transform partitioning, may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding, such as video coding using transform partitioning, may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
FIG. 7 is a block diagram of an example of spatial intra prediction modes in accordance with implementations of this disclosure.
Figure 7:
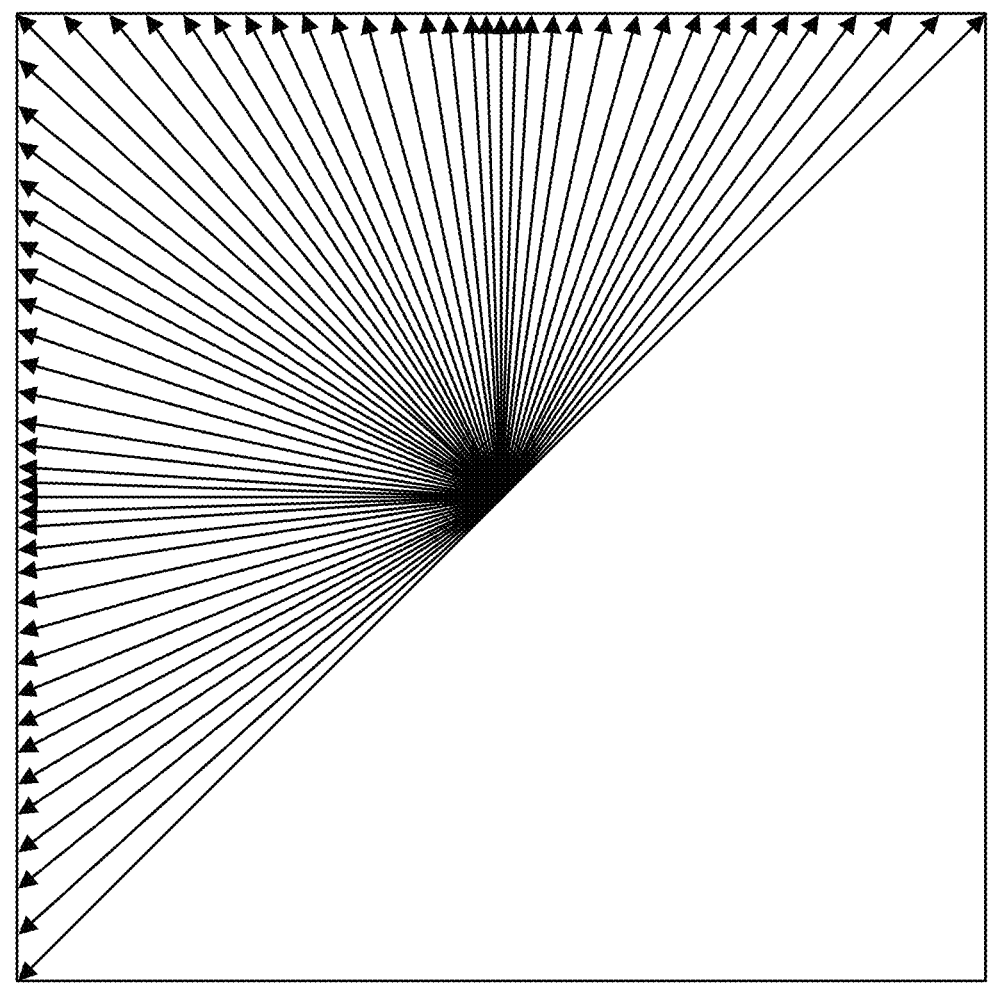

FIG. 7 is a block diagram of an example of spatial intra prediction modes 700 in accordance with implementations of this disclosure. Encoding using the spatial intra prediction modes 700 may be implemented by an encoder, such as the encoder 400 shown in FIG. 4. Decoding using the spatial intra prediction modes 700 may be implemented by a decoder, such as the decoder 500 shown in FIG. 5.

In image and video coding, intra prediction is performed to reduce spatial redundancy.

Frames, or blocks, such as blocks including edges, may be coded using an intra prediction mode from available intra prediction modes.

The available intra prediction modes may include spatial intra prediction modes. The spatial intra prediction modes may include directional intra prediction modes as shown in FIG. 7. For example, the available intra prediction modes may include sixty-five directional intra prediction modes as shown in FIG. 7. The directional intra prediction modes may include vertical intra prediction mode, horizontal intra prediction mode, and one or more angular intra prediction modes as shown in FIG. 7. In some implementations, the spatial intra prediction modes may include wide-angle luma intra prediction modes. The spatial intra prediction modes may include non-directional spatial intra prediction modes, such as a direct current (DC) intra prediction mode, a planar intra prediction mode, or both.

The available intra prediction modes may include cross-component prediction modes. An example of a cross-component intra prediction mode is shown in FIG. 8.

Figure 8:
FIG. 8 is a block diagram of an example of a cross-component intra prediction mode in accordance with implementations of this disclosure.
Figure 8:
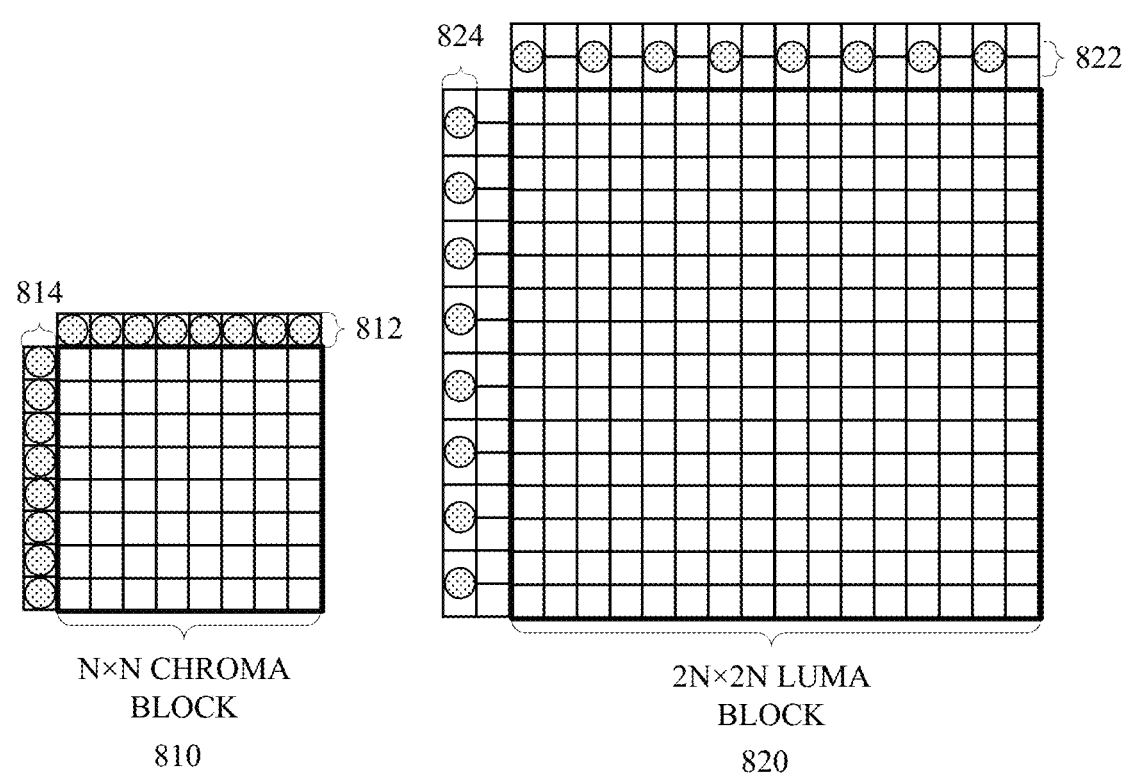

FIG. 8 is a block diagram of an example of a cross-component intra prediction mode 800. Encoding using the cross-component intra prediction mode 800 may be implemented by an encoder, such as the encoder 400 shown in FIG. 4. Decoding using the cross-component intra prediction mode 800 may be implemented by a decoder, such as the decoder 500 shown in FIG. 5.

The cross-component intra prediction mode 800 reduces redundancy among color components, such as the luminance, or luma, component (Y), and the two chrominance, or chroma, components (U and V or Cb and Cr). Cross-component intra prediction may be efficient, relative to spatial intra prediction, for some image content, such as for colorful texture rich regions.

The cross-component intra prediction mode 800, which may be chroma from luma prediction mode or cross-component linear model (CCLM) prediction mode, includes obtaining chroma sample predictions ($pred_{c(i,j)}$) for a block, or coding unit, using reconstructed luma samples, such as downsampled reconstructed luma samples ($rec'_{L(i,j)}$), for the block, or coding unit, in accordance with a linear model using two parameters ($\alpha$ and $\beta$), which may be expressed as the following:

$$pred_{C(i,j)} = \alpha \cdot rec'_{L(i,j)} + \beta.$$

Downsampled reconstructed luma samples are used to align the resolution of the luma block with the resolution of the chroma block. In some implementations, such as for 4:4:4 color format, downsampling may be omitted.

The parameters ($\alpha$ and $\beta$) are derived using a defined maximum number, count, or cardinality, such as four (4), of neighboring, such as immediately adjacent, chroma samples and corresponding down-sampled luma samples. Fewer than the defined maximum number, count, or cardinality of neighboring chroma samples and corresponding down-sampled luma samples may be used.

FIG. 8 shows a N×N (N=8) reconstructed chroma block 810 ($Rec_c$). FIG. 8 shows an example of the location of available neighboring reconstructed chroma samples above (above neighboring reconstructed chroma samples 812) and to the left of (left neighboring reconstructed chroma samples 814) the reconstructed chroma block 810.

FIG. 8 shows a 2N×2N (2N=16) reconstructed luma block 820 ($Rec'_L$). FIG. 8 shows an example of the location of available neighboring reconstructed luma samples above (above neighboring reconstructed luma samples 822) and to the left of (left neighboring reconstructed luma samples 824) the reconstructed luma block 820.

In some implementations, a division operation to obtain, such as calculate, the ($\alpha$) parameter is implemented using a look-up table.

The reconstructed luma downsampling, such as for 4:2:0 video, wherein four luma samples correspond to a respective, collocated, chroma sample, may include using one or more, such as two, downsampling filters, which are applied to the reconstructed luma samples to obtain a two-to-one downsampling ratio in the horizontal and vertical directions. In the downsampled luma block a luma sample corresponds to a respective, collocated, chroma sample. In the absence of downsampling, the chroma pixel location collocated with a group of luma pixels, or samples, such as four luma pixels, or samples, may correspond with a luma pixel location of a luma pixel, or sample, from the group of luma pixels, or samples, such as the top-left luma pixel, or sample, or may correspond with a spatial center of the group of luma pixels, or samples, or may be otherwise oriented with respect to the group of luma pixels, or samples.

A first, or type-2, 4:2:0 chroma format content, filter (f1) may be expressed as the following:

$$f1 = \begin{pmatrix} 0 & 1 & 0 \\ 1 & 4 & 1 \\ 0 & 1 & 0 \end{pmatrix}.$$

A second, or type-0, 4:2:0 chroma format content, filter (f2) may be expressed as the following:

$$f2 = \begin{pmatrix} 1 & 2 & 1 \\ 1 & 2 & 1 \end{pmatrix}.$$

The downsampling filters may be indicated using a flag, such as a sequence parameter set (SPS) level flag. In some implementations, a, such as one, luma line (general line buffer in intra prediction) is used to obtain the downsampled luma samples wherein the upper reference line is at the coding tree unit boundary.

Figure 9:
FIG. 9 is a block diagram of an example of a chroma format types in accordance with implementations of this disclosure.
Figure 9:
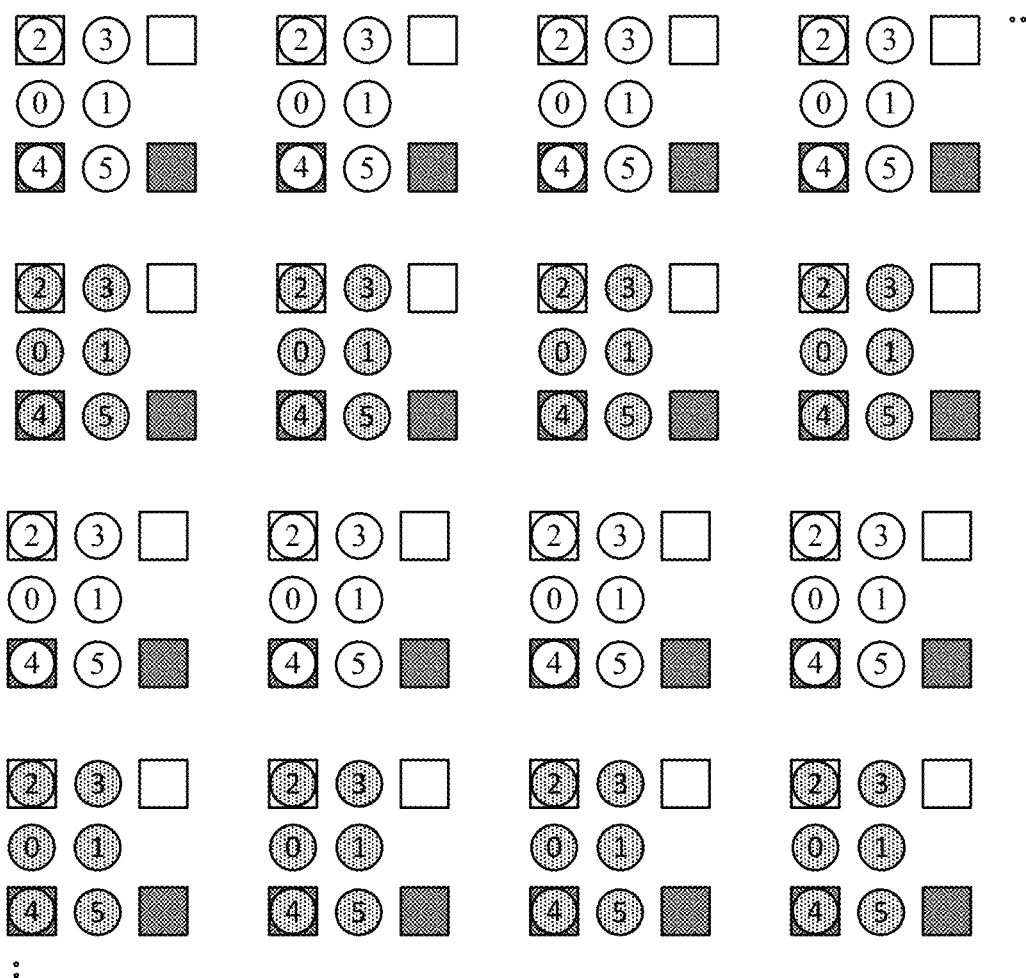

FIG. 9 is a block diagram of an example of a chroma format types 900 in accordance with implementations of this disclosure. Encoding using the chroma format types 900 may be implemented by an encoder, such as the encoder 400 shown in FIG. 4. Decoding using the chroma format types 900 may be implemented by a decoder, such as the decoder 500 shown in FIG. 5.

The chroma format types 900 include a first chroma format type (type-0), a second chroma format type (type-1), a third chroma format type (type-2), a fourth chroma format type (type-3), a fifth chroma format type (type-4), and a sixth chroma format type (type-5). FIG. 9 shows chroma sample, or pixel, locations, or positions, relative to luma sample, or pixel, locations, or positions, such as for chroma 4:2:0 video.

Figure 10:
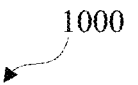
FIG. 10 is a block diagram of an example of a convolutional cross-component intra prediction mode in accordance with implementations of this disclosure.

In FIG. 9, top field luma sample, or pixel, locations, or positions, are shown as squares with a white background, bottom field luma sample, or pixel, locations, or positions, are shown as squares with a stippled background, top field type-0 chroma sample, or pixel, locations, or positions, are shown as circles with a white background and the label 0, bottom field type-0 chroma sample, or pixel, locations, or positions, are shown as circles with a stippled background and the label 0, top field type-1 chroma sample, or pixel, locations, or positions, are shown as circles with a white background and the label 1, bottom field type-1 chroma sample, or pixel, locations, or positions, are shown as circles with a stippled background and the label 1, top field type-2 chroma sample, or pixel, locations, or positions, are shown as circles with a white background and the label 2, bottom field type-2 chroma sample, or pixel, locations, or positions, are shown as circles with a stippled background and the label 2, top field type-3 chroma sample, or pixel, locations, or positions, are shown as circles with a white background and the label 3, bottom field type-3 chroma sample, or pixel, locations, or positions, are shown as circles with a stippled background and the label 3, top field type-4 chroma sample, or pixel, locations, or positions, are shown as circles with a white background and the label 4, bottom field type-4 chroma sample, or pixel, locations, or positions, are shown as circles with a stippled background and the label 4, top field type-5 chroma sample, or pixel, locations, or positions, are shown as circles with a white background and the label 5, and bottom field type-5 chroma sample, or pixel, locations, or positions, are shown as circles with a stippled background and the label 5. FIG. 10 is a block diagram of an example of a convolutional cross-component intra prediction mode 1000 in accordance with implementations of this disclosure. Encoding using the convolutional cross-component intra prediction mode 1000 (CCCM) may be implemented by an encoder, such as the encoder 400 shown in FIG. 4. Decoding using the convolutional cross-component intra prediction mode 1000 may be implemented by a decoder, such as the decoder 500 shown in FIG. 5.

The convolutional cross-component intra prediction mode 1000 includes using a convolutional filter, such as a seven tap (7-tap) filter having a five tap (5-tap) plus sign shape spatial component, a nonlinear term (P), and a bias term (B) (bias parameter). The input to the five tap (5-tap) plus sign shape spatial component includes a center (C) luma sample, which is collocated with the current chroma sample for prediction, a north (N) luma sample above the center (C) luma sample, a south(S) luma sample below the center (C) luma sample, a west (W) luma sample to the left of the center (C) luma sample, and an east (E) luma sample to the right of the center (C) luma sample. In some implementations, the chroma format is other than 4:4:4, such as 4:2:0, and the luma samples (C, N, E, S, W) are downsampled luma samples.

The nonlinear term (P) may be represented as power of two of the center luma sample (C) and scaled to the sample value range of the content. Obtaining the nonlinear term P may be expressed as the following:

$$P = (C * C + midVal) >> bitDepth.$$

For example, for ten-bit (10-bit) content, obtaining the nonlinear term (P) may be expressed as the following:

$$P = (C * C + 512) >> 10.$$

The bias term (B) represents a scalar offset between the input and output, which may be similar to an offset term of the cross-component linear model (CCLM) prediction mode shown in FIG. 8, except as is described herein or as is otherwise clear from context. The bias term (B) is set to a middle chroma value (midVal), such as 512 for 10-bit content (bitDepth).

Output (predChroma Val) of the filter may be obtained, such as calculated, as a convolution between the filter coefficients (Ci) and the input values, and may be clipped to the range of valid chroma samples, which may be expressed as the following:

$$predChromaVal = c_0C + c_1N + c_2S + c_3E + c_4W + c_5P + c_6B.$$

The filter coefficients (Ci) may be obtained by minimizing mean squared error (MSE) between predicted and reconstructed chroma samples in a defined reference area. An example of the defined reference area is shown in FIG. 11.

Figure 11:
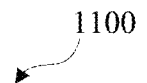
FIG. 11 is a block diagram of an example of a defined reference area for convolutional cross-component intra prediction mode in accordance with implementations of this disclosure.
Figure 11:
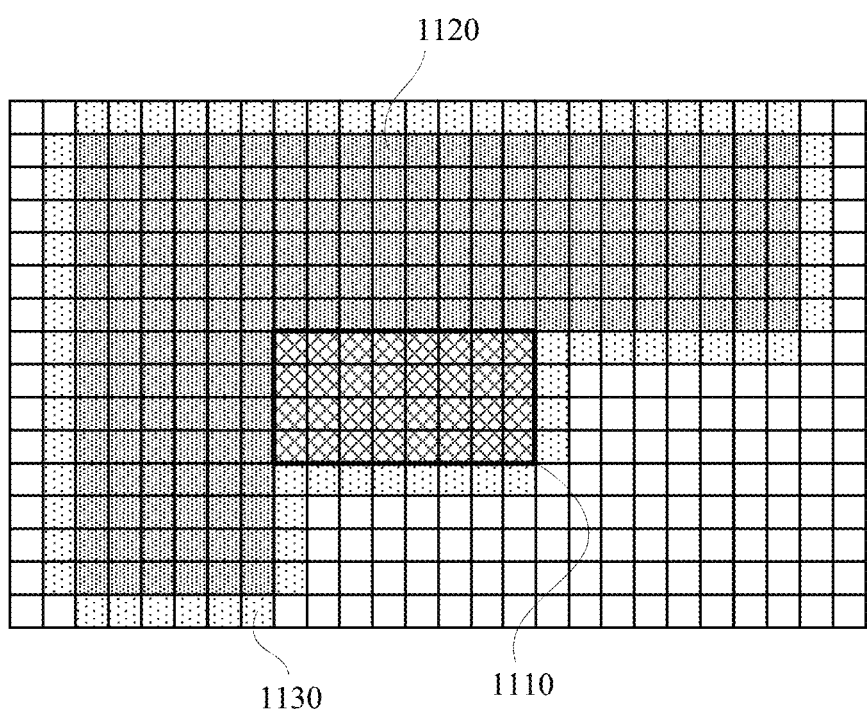

FIG. 11 is a block diagram of an example of a defined reference area 1100 for convolutional cross-component intra prediction mode in accordance with implementations of this disclosure. Encoding using the defined reference area 1100 for convolutional cross-component intra prediction mode may be implemented by an encoder, such as the encoder 400 shown in FIG. 4. Decoding using the defined reference area 1100 for convolutional cross-component intra prediction mode may be implemented by a decoder, such as the decoder 500 shown in FIG. 5.

The defined reference area 1100 for convolutional cross-component intra prediction mode, such as the convolutional cross-component intra prediction mode 1000 shown in FIG. 10, includes a current block, or prediction unit, 1110 (shown with a hatched background and a thick border), a primary reference area 1120 (shown with a dark stippled background), and a secondary reference area 1130 (shown with a light stippled background).

The current block, or prediction unit, 1110 is an M×N block, or prediction unit, with a width (M) of eight pixels as shown and a height (N) of four pixels as shown (8×4).

The primary reference area 1120 includes a defined number, count, or cardinality, such as six as shown, lines, or rows, of chroma samples, and corresponding luma samples, above the current block 1110 and extending by the width (M) of the current block 1110 columns to the right and by the defined number, count, or cardinality, six as shown, columns to the left, and the defined number, count, or cardinality of lines, or columns, of chroma samples to the left of the current block 1110 and extending down by the height (N) of the current block 1110 rows. In some implementations, one or more of the pixel locations in the primary reference areas 1120 may be unavailable and may be omitted from the reference area.

The secondary reference area 1130 includes a defined number, count, or cardinality, of pixels, such as one pixel, to the left, to the right, above, and below the primary reference area 1120 as shown such that the north (N) luma sample above a center (C) luma sample along the top row of the primary reference area 1120 is included, the south(S) luma sample below a center (C) luma sample along the bottom row of the primary reference area 1120 is included, the west (W) luma sample to the left of a center (C) luma sample along the left column of the primary reference area 1120 is included, and the east (E) luma sample to the right of a center (C) luma sample along the right column of the primary reference area 1120 is included. In some implementations, one or more of the pixel locations in the secondary reference area 1130 may be unavailable and may be padded, such as by using a defined value or by obtaining a value from a defined location, for inclusion.

Minimizing the mean squared error (MSE) between predicted and reconstructed chroma samples in the defined reference area 1100 (1120 and 1130) includes obtaining, such as by calculating, an autocorrelation matrix for the luma samples from the primary reference area 1120 and a cross-correlation vector between the luma samples from the primary reference area 1120 and the chroma samples from the primary reference area 1120. The autocorrelation matrix is decomposed, such as using lower diagonal lower (LDL) decomposition, and the resulting filter coefficients are obtained, such as computed, using back-substitution.

The use of a convolutional cross-component intra prediction mode, such as shown in FIGS. 10 and 11, may be signaled, such as using a contextually coded, such as using context adaptive binary arithmetic coding, block, or prediction unit, level flag, bit, or symbol, which may include using an entropy coding context specific to coding the use of the convolutional cross-component intra prediction mode. In some implementations, the use of the convolutional cross-component intra prediction mode may be omitted in the absence of the use, and signaling, of a cross-component intra prediction mode. For example, in the absence of a bit, flag, or symbol indicating the use of a cross-component intra prediction mode, the decoder may omit obtaining a bit, flag, or symbol indicating the use of convolutional cross-component intra prediction mode, which may be absent from the bitstream.

Figure 12:
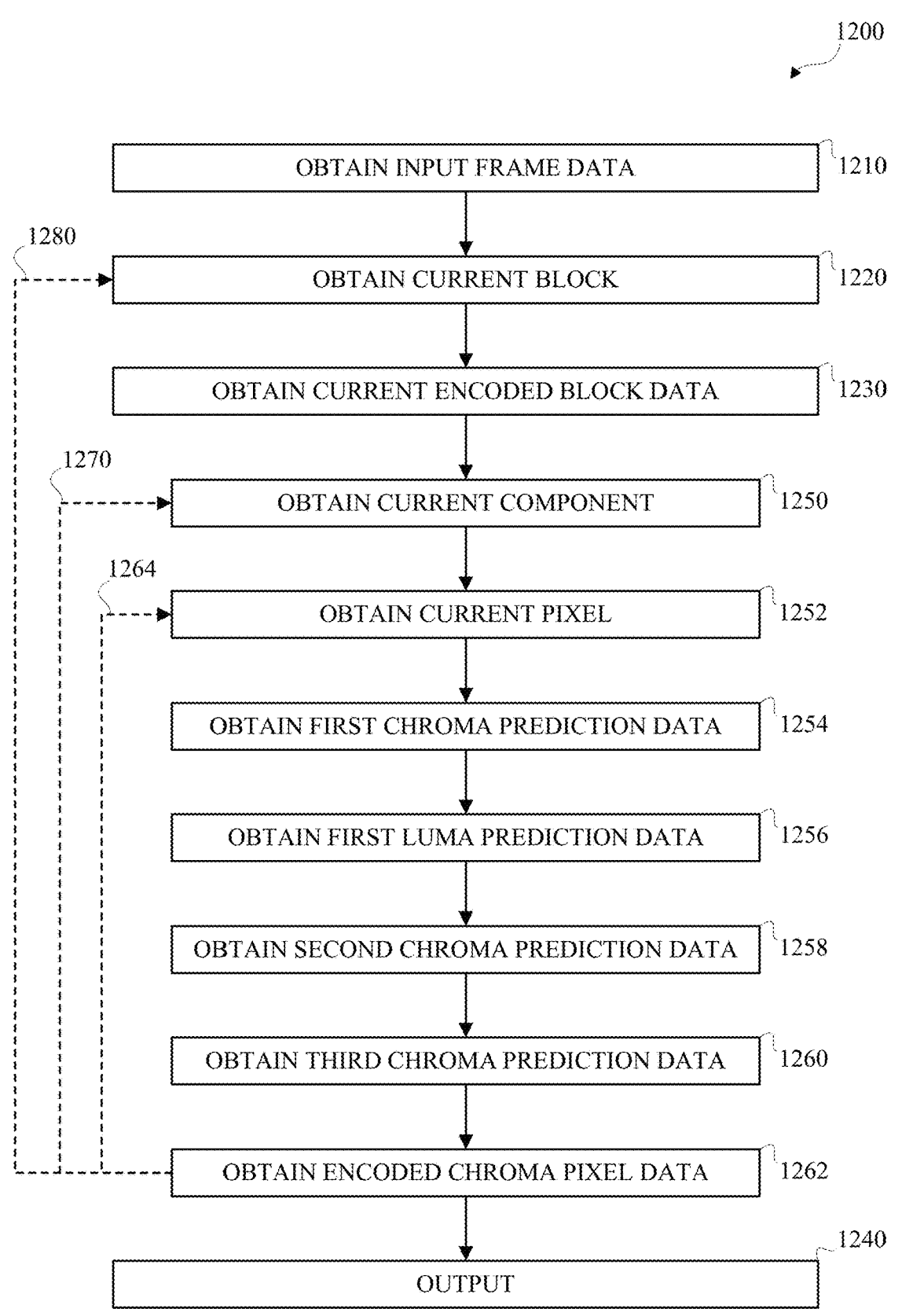
FIG. 12 is a flow diagram of an example of encoding using chroma intra prediction with filtering in accordance with implementations of this disclosure.

FIG. 12 is a flow diagram of an example of encoding using chroma intra prediction with filtering 1200 in accordance with implementations of this disclosure. Encoding using chroma intra prediction with filtering 1200 may be implemented by an encoder, such as the encoder 400 shown in FIG. 4.

Encoding using chroma intra prediction with filtering 1200 includes encoding an input frame or an input video steam, such as the input video stream 402 shown in FIG. 4, or one or more portions thereof, to generate an encoded (compressed) output bitstream, such as the encoded (compressed) bitstream 404 shown in FIG. 4.

In block-based hybrid video coding, to reduce, or minimize, the resource utilization, such as bandwidth utilization, for signaling, storing, or both, compressed, or encoded, video data, redundant data, such as spatially redundant data, temporally redundant data, or both, is omitted or excluded from the compressed, or encoded, data.

Encoding using chroma intra prediction with filtering 1200 includes obtaining input fame data (at 1210), obtaining a current block (at 1220), obtaining current encoded block data (at 123), and outputting the encoded bitstream (at 1240). Although not shown expressly in FIG. 12, one or more aspects of encoding using chroma intra prediction with filtering 1200 may be omitted from the description herein for simplicity and brevity.

The input frame data is obtained (at 1210) for a current frame. The input frame data may be a portion of input video data that includes a sequence of frames (input frames), wherein the input frame data represents, expresses, or defines the current frame. For example, the encoder, or a component thereof, such as an intra/inter prediction unit of the encoder, such as the intra/inter prediction unit 410 shown in FIG. 4, may obtain the input frame data.

The current frame may be obtained (at 1210) subsequent to encoding one or more other frames, such as a frame sequentially preceding the current frame in the input video stream, and generating, or otherwise obtaining, a corresponding reconstructed frame (or frames), or one or more portions thereof, for use as a reference frame (or frames) for encoding the current frame.

The current block for encoding is obtained (at 1220) from the current frame. The current block may be obtained (at 1220) subsequent to encoding one or more other blocks, such as a block sequentially preceding the current block in the current frame, in accordance with a block coding order for coding the current frame, and generating, or otherwise obtaining, a corresponding reconstructed block, or one or more portions thereof.

Encoded block data is obtained (at 1230) for the current block. Obtaining, or generating, the encoded block data includes encoding the current block, which includes obtaining current component data for the current block (at 1250), obtaining current chroma pixel data for a current pixel from the current component data for the current block (at 1252), obtaining first chroma prediction data (at 1254), obtaining current luma prediction data (at 1256), obtaining second chroma prediction data (at 1258), obtaining third chroma prediction data (at 1260), and obtaining encoded chroma pixel data (at 1262).

Although not shown in FIG. 12, obtaining the current encoded block data (at 1230) may include obtaining encoded luma block data for the current block, obtaining current reconstructed luma block data for the current block, or both, such as prior to obtaining the current component data for the current block (at 1250), obtaining the current chroma pixel data for the current pixel from the current component data for the current block (at 1252), obtaining the first chroma prediction data (at 1254), obtaining the current luma prediction data (at 1256), obtaining the second chroma prediction data (at 1258), obtaining the third chroma prediction data (at 1260), and obtaining the encoded chroma pixel data (at 1262). For example, a current superblock, or a current coding tree unit, includes the current chroma block, and encoded luma block data, reconstructed luma block data, or both, may be obtained for the current superblock, or the current coding tree unit, such as prior to obtaining the current component data for the current block (at 1250), obtaining the current chroma pixel data for the current pixel from the current component data for the current block (at 1252), obtaining the first chroma prediction data (at 1254), obtaining the current luma prediction data (at 1256), obtaining the second chroma prediction data (at 1258), obtaining the third chroma prediction data (at 1260), and obtaining the encoded chroma pixel data (at 1262), such that the encoded luma block data, the reconstructed luma block data, or both, for the current superblock, or the current coding tree unit, is available for obtaining the current encoded block data.

The current component data, such as the U component data or the V component data, for the current block is obtained (at 1250). The current block data for the current block includes a current luma block, and two current chroma blocks, such as a first current chroma block, such as a U component current chroma block, and a second current chroma block, such as a V component current chroma block. The current component data includes, as the current chroma block, the first current chroma block or the second current chroma block.

The current chroma pixel data for the current chroma pixel from the current chroma block is obtained (at 1252).

The first chroma prediction data is obtained (at 1254). Obtaining the first chroma prediction data includes obtaining a first chroma prediction value (P1) for the current chroma pixel using a spatial intra prediction mode for the current chroma block (current spatial intra prediction mode), other than a cross-component intra prediction mode, such as a spatial intra prediction mode as shown in FIG. 7.

In some implementations, a partition decision, or a partition tree, for the current chroma block, such as for a current superblock, or a current coding tree unit, including the current chroma block, matches a partition decision, or a partition tree, for the current luma block, the spatial intra prediction mode for the current chroma block is the spatial intra prediction mode used to obtain the current reconstructed luma block data for the current block, and signaling the spatial intra prediction mode for the current chroma block is omitted, avoided, skipped, or excluded.

In some implementations, the partition decision, or the partition tree, for the current chroma block differs from the partition decision, or the partition tree, for the current luma block and the spatial intra prediction mode for the current chroma block is signaled in the encoded bitstream, such that the width, the height, or both, of the current chroma block may differ from the current luma block. In some implementations, the partition decision, or the partition tree, for the current chroma block differs from the partition decision, or the partition tree, for the current luma block and the spatial intra prediction mode for the current chroma block is a defined spatial intra prediction mode, such as direct mode (DM), wherein spatial intra prediction mode for the current luma block from the luma prediction data, for a current luma pixel, collocated with the first chroma pixel, used to obtain the current reconstructed luma block data for the current block, is used as the spatial intra prediction mode for the current chroma block.

The first chroma prediction data for the current chroma pixel is obtained, such as predicted, using the spatial intra prediction mode for the current chroma block (at 1254).

The current luma prediction data is obtained (at 1256) for the current luma pixel, collocated with the first chroma pixel. The current luma prediction data includes a luma prediction value for the current luma pixel, collocated with the first chroma pixel.

In some implementations, the partition decision, or the partition tree, for the current chroma block matches the partition decision, or the partition tree, for the current luma block, and obtaining the current luma prediction data (at 1256) includes obtaining, as the current luma prediction data, the luma prediction data, for the current luma pixel, collocated with the first chroma pixel, used to obtain the current reconstructed luma block data for the current block (reused luma prediction data).

In some implementations, the partition decision, or the partition tree, for the current chroma block differs from the partition decision, or the partition tree, for the current luma block and obtaining the current luma prediction data (at 1256) includes regenerating, or otherwise obtaining, such as by predicting, the current luma prediction data for the current luma pixel, which is collocated with the first chroma pixel, from the current luma block using the spatial intra prediction mode for the current chroma block, wherein the current luma prediction data is a local intermediate prediction that is omitted from use with respect to coding the current luma block (regenerated luma prediction data).

In some implementations, whether the current luma prediction data is reused luma prediction data or regenerated luma prediction data may be encoded, signaled, or otherwise included in the encoded bitstream.

The second chroma prediction data is obtained (at 1258) for the current chroma pixel for the current chroma component by applying derived filter coefficients to the current reconstructed luma value to obtain a second chroma prediction value (P2). Obtaining the second chroma prediction data (at 1258) includes obtaining the derived filter coefficients. Obtaining the derived filter coefficients is similar to obtaining filter coefficients as shown in FIGS. 9 and 10, except as is described herein or as is otherwise clear from context. For example, obtaining the derived filter coefficients (at 1258) includes calculating, an autocorrelation matrix for the luma samples from the predicted luma samples corresponding to the current block and a cross-correlation vector between the predicted luma samples corresponding to the current block and the chroma samples predicted for the current block using the current spatial intra prediction mode. The autocorrelation matrix is decomposed, such as using lower diagonal lower (LDL) decomposition, and the resulting filter coefficients are obtained, such as computed, using back-substitution.

Obtaining the derived filter coefficients may include obtaining the derived filter coefficients using a downsampled luma prediction block, a downsampled luma reconstruction block, or both, which may be similar to obtaining filter coefficients as shown in FIGS. 9 and 10, except as is described herein or as is otherwise clear from context.

Obtaining the derived filter coefficients may include using a defined filter shape, such as diamond, cross, plus, rectangular, or the like.

In some implementations, obtaining the derived filter coefficients may include obtaining one or more non-linear parameters, or terms, which may be similar to obtaining filter coefficients as shown in FIGS. 9 and 10, except as is described herein or as is otherwise clear from context.

In some implementations, obtaining the derived filter coefficients may include obtaining one or more, such as one, bias terms, which may be similar to obtaining filter coefficients as shown in FIGS. 9 and 10, except as is described herein or as is otherwise clear from context.

In some implementations, using the downsampled luma prediction block, the downsampled luma reconstruction block, or both, may be omitted, or skipped, and the luma prediction block, reconstructed luma prediction block, or both, in the absence of, or without, downsampling, may be used, which may be similar to obtaining filter coefficients as shown in FIGS. 9 and 10 wherein downsampling is omitted, except as is described herein or as is otherwise clear from context, which may include using an identified filter shape, such as a 3×2 rectangular filter, a diamond filter, or the like.

In some implementations, whether to use the downsampled luma prediction block, the downsampled luma reconstruction block, or both, may be defined, such as at the encoder and the decoder, such as prior to encoding using chroma intra prediction with filtering 1200.

In some implementations, whether to use the downsampled luma prediction block, the downsampled luma reconstruction block, or both, may be signaled in the encoded bitstream. In some implementations, whether to use the downsampled luma prediction block, the downsampled luma reconstruction block, or both, may be signaled in the encoded bitstream for the available spatial intra prediction modes. In another example, whether to use the downsampled luma prediction block, the downsampled luma reconstruction block, or both, may be signaled in the encoded bitstream on a per-spatial-intra-prediction-mode basis for the available spatial intra prediction modes.

Encoding, or signaling, whether to use the downsampled luma prediction block, the downsampled luma reconstruction block, or both, may include using variable length coding. In some implementations, a number, count, or cardinality, of bins may be context coded. In some implementations, a defined bin, such as a bin corresponding to coding whether to use the downsampled luma prediction block, the downsampled luma reconstruction block, or both, may be adaptively derived. In some implementations, determining whether to use the downsampled luma prediction block, the downsampled luma reconstruction block, or both, may include determining, or otherwise obtaining, content data indicating whether the current block, the current frame, or a current sequence of frames including the current frame, include screen content, such as computer desktop screen content, such as content including text or other sharp edges, such as content other than content captured by a camera, wherein downsampling may blur the content. In response to determining that the content data indicates that the current block, the current frame, or a current sequence of frames including the current frame, include screen content downsampling may be omitted. Encoding, or signaling, whether to use the downsampled luma prediction block, the downsampled luma reconstruction block, or both, may include using the content data indicating whether the current block, the current frame, or a current sequence of frames including the current frame, include screen content as context for encoding, or signaling, whether to use the downsampled luma prediction block, the downsampled luma reconstruction block, or both.

In some implementations, the filter shape may be defined, such as at the encoder and the decoder, such as prior to encoding using chroma intra prediction with filtering 1200.

In some implementations, the filter shape may be signaled in the encoded bitstream. Encoding, or signaling, the filter shape may include using variable length coding. In some implementations, a number, count, or cardinality, of bins may be context coded.

In some implementations, the number, count, or cardinality of non-linear terms may be defined, such as at the encoder and the decoder, such as prior to encoding using chroma intra prediction with filtering 1200.

In some implementations, the number, count, or cardinality of non-linear terms may be signaled in the encoded bitstream. Encoding, or signaling, the number, count, or cardinality of non-linear terms may include using variable length coding. In some implementations, a number, count, or cardinality, of bins may be context coded.

The third chroma prediction data is obtained (at 1260). Obtaining the third chroma prediction data (at 1260) includes obtaining, as a third chroma prediction value (P3) for the current chroma pixel for the current chroma component, a weighted average of the first chroma prediction value (P1) and the second chroma prediction value (P2). In some implementations, the wight (w) applied to the first chroma prediction value (P1) to obtain the third chroma prediction data (at 1260) is zero (0) and the second chroma prediction value (P2) is used as the third chroma prediction value. In some implementations, the weight (w) may be 0.5, and the third chroma prediction value is an average of the first chroma prediction value (P1) and the second chroma prediction value (P2). In some implementations, obtaining the third chroma prediction value (P3) may be expressed as the following:

$$P3 = (1 - w) * P0 + w * P1.$$

The encoded chroma pixel data is obtained (at 1262) for the current chroma pixel by encoding the current chroma pixel using the third chroma prediction value, such as by subtracting the third chroma prediction value from the current chroma pixel and encoding the resulting residual chroma pixel value. The encoded chroma pixel data is included in the encoded block data for the current block. The encoded block data for the current block is included in the output, compressed, or encoded bitstream.

Obtaining the current chroma pixel data for the current pixel from the current component data for the current block (at 1252), obtaining the first chroma prediction data (at 1254), obtaining the current luma prediction data (at 1256), obtaining the second chroma prediction data (at 1258), obtaining the third chroma prediction data (at 1260), and the obtaining the encoded chroma pixel data (at 1262) may be performed on a per-pixel basis for the chroma pixels from the current chroma block for the current chroma component, as indicated by the broken directional line (at 1264) from obtaining the encoded chroma pixel data (at 1262) to obtaining the current chroma pixel data for a current pixel from the current component data for the current block (at 1252).

Obtaining the current component data for the current block (at 1250), obtaining the current chroma pixel data for the current pixel from the current component data for the current block (at 1252), obtaining the first chroma prediction data (at 1254), obtaining the current luma prediction data (at 1256), obtaining the second chroma prediction data (at 1258), obtaining the third chroma prediction data (at 1260), and obtaining the encoded chroma pixel data (at 1262) may be performed on a per-chroma-component basis for the current block, as indicated by the broken directional line (at 1270) from obtaining the encoded chroma pixel data (at 1262) to current the component data for the current block (at 1250).

Obtaining the current encoded block data (at 1230) may be performed on a per-block, or per coding unit, basis for the current frame, as indicated by the broken directional line (at 1280) from obtaining the encoded chroma pixel data (at 1262) to current the encoded block data (at 1230).

The output, compressed, or encoded bitstream, is output (at 1240), such as stored or transmitted, such as to a decoder.

In some implementations, one or more coding parameters for the current chroma block, such as the derived filter coefficients, the spatial intra prediction mode, or both, may be recorded, stored, or otherwise maintained, and may be used to encode one or more subsequent blocks. In some implementations, obtaining the first chroma prediction data (at 1254), obtaining the current luma prediction data (at 1256), and obtaining the second chroma prediction data (at 1258) may be omitted and obtaining third chroma prediction data (at 1260) may include obtaining the third chroma prediction data by applying derived filter coefficients previously obtained for coding a previously coded block to the collocated luma pixel from the reconstructed luma block. In some implementations, obtaining the first chroma prediction data (at 1254) and obtaining the current luma prediction data (at 1256) include using a spatial intra prediction mode previously used for coding a previously coded block as the spatial intra prediction mode for the current block.

Figure 13:
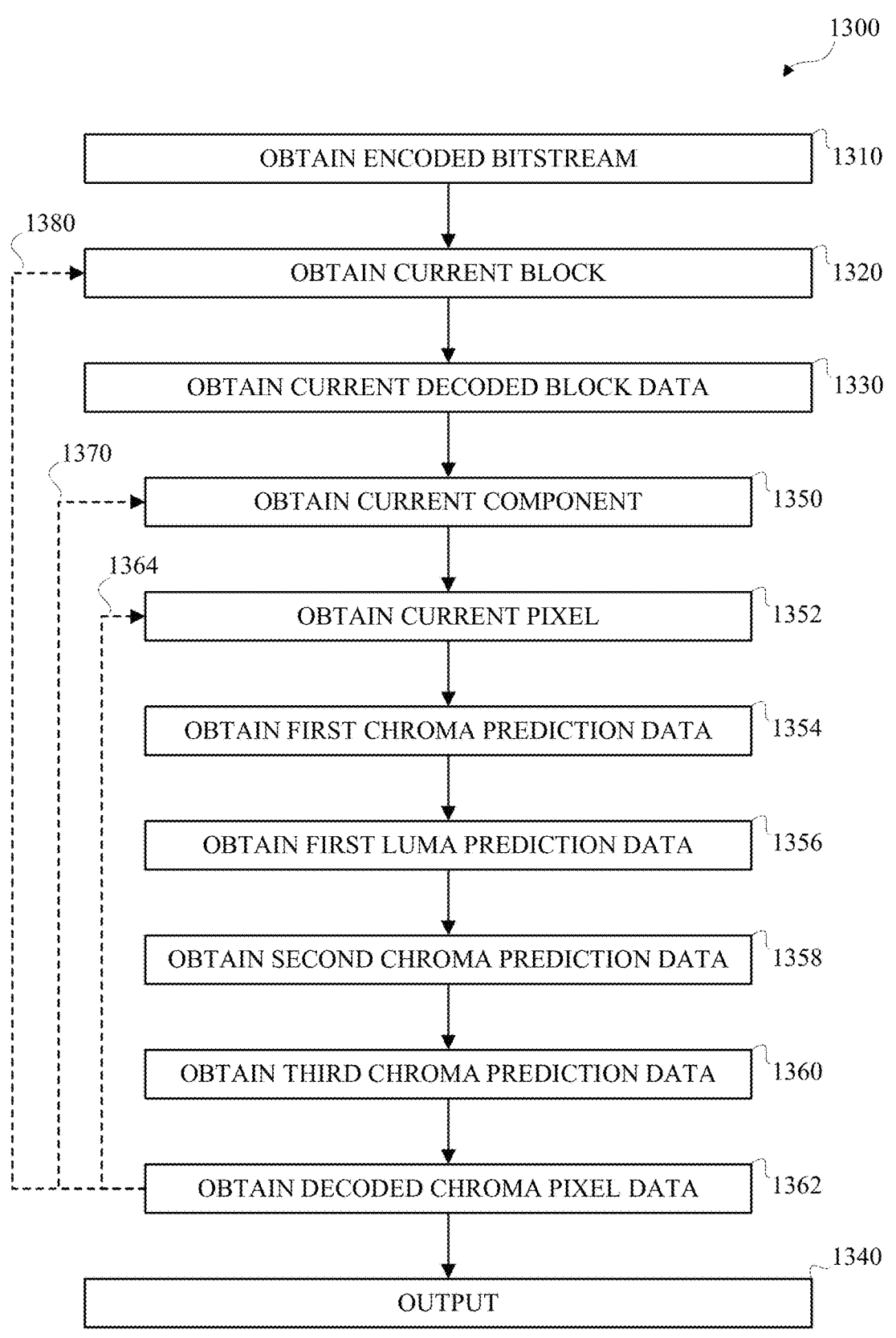
FIG. 13 is a flow diagram of an example of decoding using chroma intra prediction with filtering in accordance with implementations of this disclosure.

FIG. 13 is a flow diagram of an example of decoding using chroma intra prediction with filtering 1300 in accordance with implementations of this disclosure. Decoding using chroma intra prediction with filtering 1300 may be implemented by a decoder, such as the decoder 500 shown in FIG. 5. Decoding using chroma intra prediction with filtering 1300 includes block-based hybrid video coding as described herein. Decoding using chroma intra prediction with filtering 1300 includes generating reconstructed frame data by decoding an encoded bitstream, such as the compressed bitstream 502 shown in FIG. 5, or one or more portions thereof, to generate a reconstructed frame, or a portion thereof, or a reconstructed video, or a portion thereof, including the reconstructed frame, such as the output video stream 504 shown in FIG. 5. Decoding using chroma intra prediction with filtering 1300 includes obtaining input fame data (at 1310), obtaining a current block (at 1320), obtaining current decoded block data (at 133), and outputting the encoded bitstream (at 1340). Although not shown expressly in FIG. 13, one or more aspects of decoding using chroma intra prediction with filtering 1300 may be omitted from the description herein for simplicity and brevity.

The encoded bitstream is obtained (at 1310). For example, the decoder, or a component thereof, such as an intra/inter prediction unit of the decoder, such as the entropy decoding unit 510 shown in FIG. 5, may obtain the encoded bitstream. Obtaining the encoded bitstream includes identifying a current frame, which may be from a current sequence of frames, to decode from the encoded bitstream to generate a current reconstructed frame.

The current frame may be obtained (at 1310) subsequent to decoding one or more other frames, such as a frame sequentially preceding the current frame in the encoded bitstream, and generating, or otherwise obtaining, a corresponding reconstructed frame (or frames), or one or more portions thereof, for use as a reference frame (or frames) for decoding the current frame.

The current block, of the current frame, for decoding is identified, determined, or otherwise obtained (at 1320). The current block may be obtained (at 1320) subsequent to decoding one or more other blocks, such as a block sequentially preceding the current block in the current frame, in accordance with a block coding order for coding the current frame, and generating, or otherwise obtaining, a corresponding reconstructed block, or one or more portions thereof. Decoded block data is obtained (at 1330) for the current block. Obtaining, or generating, the decoded block data (current decoded block data) includes decoding encoded block data for the current block, which includes obtaining current component data for the current block (at 1350), obtaining a current chroma pixel from the current component data for the current block (at 1352), obtaining first chroma prediction data (at 1354), obtaining current luma prediction data (at 1356), obtaining second chroma prediction data (at 1358), obtaining third chroma prediction data (at 1360), and obtaining decoded chroma pixel data (at 1362).

Although not shown in FIG. 13, obtaining the current decoded block data (at 1330) may include obtaining decoded luma block data for the current block, obtaining current reconstructed luma block data for the current block, or both, such as prior to obtaining the current component data for the current block (at 1350), obtaining the current chroma pixel data for the current pixel from the current component data for the current block (at 1352), obtaining the first chroma prediction data (at 1354), obtaining the current luma prediction data (at 1356), obtaining the second chroma prediction data (at 1358), obtaining the third chroma prediction data (at 1360), and obtaining the decoded chroma pixel data (at 1362). For example, a current superblock, or a current coding tree unit, includes the current chroma block, and decoded luma block data, reconstructed luma block data, or both, may be obtained for the current superblock, or the current coding tree unit, such as prior to obtaining the current component data for the current block (at 1350), obtaining the current chroma pixel data for the current pixel from the current component data for the current block (at 1352), obtaining the first chroma prediction data (at 1354), obtaining the current luma prediction data (at 1356), obtaining the second chroma prediction data (at 1358), obtaining the third chroma prediction data (at 1360), and obtaining the decoded chroma pixel data (at 1362), such that the decoded luma block data, the reconstructed luma block data, or both, for the current superblock, or the current coding tree unit, is available for obtaining the current decoded block data.

The current component data for the current block is obtained (at 1350), which includes identifying a first chroma component, such as the U component, or a second chroma component, such as the V, as the current chroma component, and identifying a corresponding current chroma block.

The current chroma pixel data for the current chroma pixel from the current chroma block is obtained (at 1352).

The first chroma prediction data is obtained (at 1354). Obtaining the first chroma prediction data includes obtaining a first chroma prediction value (P1) for the current chroma pixel using a spatial intra prediction mode for the current chroma block, other than a cross-component intra prediction mode, such as a spatial intra prediction mode as shown in FIG. 7.

In some implementations, a partition decision, or a partition tree, for the current chroma block, such as for a current superblock, or a current coding tree unit, including the current chroma block, matches a partition decision, or a partition tree, for the current luma block, the spatial intra prediction mode for the current chroma block is the spatial intra prediction mode used to obtain the current reconstructed luma block data for the current block, and decoding, reading, extracting, or otherwise obtaining, the spatial intra prediction mode for the current chroma block from the encoded bitstream is omitted, avoided, skipped, or excluded.

In some implementations, the partition decision, or the partition tree, for the current chroma block differs from the partition decision, or the partition tree, for the current luma block and obtaining the first chroma prediction data includes decoding, reading, extracting, or otherwise obtaining, the spatial intra prediction mode for the current chroma block from the encoded bitstream.

In some implementations, the partition decision, or the partition tree, for the current chroma block differs from the partition decision, or the partition tree, for the current luma block and the spatial intra prediction mode for the current chroma block is a defined spatial intra prediction mode, such as direct mode (DM), wherein spatial intra prediction mode for the current luma block from the luma prediction data, for a current luma pixel, collocated with the first chroma pixel, used to obtain the current reconstructed luma block data for the current block, is used as the spatial intra prediction mode for the current chroma block.

The first chroma prediction data for the current chroma pixel is obtained, such as predicted, using the spatial intra prediction mode for the current chroma block (at 1354).

The current luma prediction data is obtained (at 1356) for the current luma pixel, collocated with the first chroma pixel. The current luma prediction data includes a luma prediction value for the current luma pixel, collocated with the first chroma pixel.

In some implementations, the partition decision, or the partition tree, for the current chroma block matches the partition decision, or the partition tree, for the current luma block, and obtaining the current luma prediction data (at 1356) includes obtaining, as the current luma prediction data, the luma prediction data, for the current luma pixel, collocated with the first chroma pixel, used to obtain the current reconstructed luma block data for the current block (reused luma prediction data).

In some implementations, the partition decision, or the partition tree, for the current chroma block differs from the partition decision, or the partition tree, for the current luma block and obtaining the current luma prediction data (at 1356) includes regenerating, or otherwise obtaining, such as by predicting, the current luma prediction data for the current luma pixel, which is collocated with the first chroma pixel, from the current luma block using the spatial intra prediction mode for the current chroma block, wherein the current luma prediction data is a local intermediate prediction that is omitted from use with respect to coding the current luma block (regenerated luma prediction data).

In some implementations, obtaining the first chroma prediction data includes decoding, reading, extracting, or otherwise obtaining, data indicating whether the current luma prediction data is reused luma prediction data or regenerated luma prediction data from the encoded bitstream.

The second chroma prediction data is obtained (at 1358) for the current chroma pixel for the current chroma component by applying derived filter coefficients to the current luma prediction value to obtain a second chroma prediction value (P2). Obtaining the second chroma prediction data (at 1358) includes obtaining the derived filter coefficients. Obtaining the derived filter coefficients may be similar to obtaining filter coefficients as shown in FIGS. 9 and 10, except as is described herein or as is otherwise clear from context. Obtaining the derived filter coefficients may include obtaining the derived filter coefficients using a downsampled luma prediction block, a downsampled luma reconstruction block, or both, which may be similar to obtaining filter coefficients as shown in FIGS. 9 and 10, except as is described herein or as is otherwise clear from context.

Obtaining the derived filter coefficients may include using a defined filter shape, such as diamond, cross, plus, rectangular, or the like.

In some implementations, obtaining the derived filter coefficients may include obtaining one or more non-linear terms, or parameters, which may be similar to obtaining filter coefficients as shown in FIGS. 9 and 10, except as is described herein or as is otherwise clear from context.

In some implementations, obtaining the derived filter coefficients may include obtaining one or more, such as one, bias terms, which may be similar to obtaining filter coefficients as shown in FIGS. 9 and 10, except as is described herein or as is otherwise clear from context.

In some implementations, using the downsampled luma prediction block, the downsampled luma reconstruction block, or both, may be omitted, or skipped, and the luma prediction block, reconstructed luma prediction block, or both, in the absence of, or without, downsampling, may be used, which may be similar to obtaining filter coefficients as shown in FIGS. 9 and 10 wherein downsampling is omitted, except as is described herein or as is otherwise clear from context, which may include using an identified filter shape, such as a 3×2 rectangular filter, a diamond filter, or the like.

In some implementations, whether to use the downsampled luma prediction block, the downsampled luma reconstruction block, or both, may be defined, such as at the encoder and the decoder, such as prior to decoding using chroma intra prediction with filtering 1300.

In some implementations, obtaining the first chroma prediction data includes decoding, reading, extracting, or otherwise obtaining, data indicating whether to use the downsampled luma prediction block, the downsampled luma reconstruction block, or both, from the encoded bitstream. In some implementations, obtaining the first chroma prediction data includes decoding, reading, extracting, or otherwise obtaining, data indicating whether to use the downsampled luma prediction block, the downsampled luma reconstruction block, or both, from the encoded bitstream for the available spatial intra prediction modes. In another example, obtaining the first chroma prediction data includes decoding, reading, extracting, or otherwise obtaining, data indicating whether to use the downsampled luma prediction block, the downsampled luma reconstruction block, or both, from the encoded bitstream on a per-spatial-intra-prediction-mode basis for the available spatial intra prediction modes. Decoding, reading, extracting, or otherwise obtaining, the data indicating whether to use the downsampled luma prediction block, the downsampled luma reconstruction block, or both, may include using variable length coding. In some implementations, a number, count, or cardinality, of bins may be context coded. In some implementations, a defined bin, such as a bin corresponding to coding whether to use the downsampled luma prediction block, the downsampled luma reconstruction block, or both, may be adaptively derived. In some implementations, determining whether to use the downsampled luma prediction block, the downsampled luma reconstruction block, or both, may include determining, or otherwise obtaining, content data indicating whether the current block, the current frame, or a current sequence of frames including the current frame, include screen content, such as computer desktop screen content, such as content including text or other sharp edges, such as content other than content captured by a camera, wherein downsampling may blur the content. In response to determining that the content data indicates that the current block, the current frame, or a current sequence of frames including the current frame, include screen content downsampling may be omitted. Decoding, reading, extracting, or otherwise obtaining, the data indicating whether to use the downsampled luma prediction block, the downsampled luma reconstruction block, or both, may include using the content data indicating whether the current block, the current frame, or a current sequence of frames including the current frame, include screen content as context for decoding, reading, extracting, or otherwise obtaining, the data indicating whether to use the downsampled luma prediction block, the downsampled luma reconstruction block, or both.

In some implementations, the filter shape may be defined, such as at the encoder and the decoder, such as prior to decoding using chroma intra prediction with filtering 1300.

In some implementations, obtaining the first chroma prediction data includes decoding, reading, extracting, or otherwise obtaining, data indicating the filter shape from the encoded bitstream. Decoding, reading, extracting, or otherwise obtaining, the data indicating the filter shape from the encoded bitstream may include using variable length coding. In some implementations, a number, count, or cardinality, of bins may be context coded.

In some implementations, the number, count, or cardinality of non-linear terms may be defined, such as at the decoder and the decoder, such as prior to decoding using chroma intra prediction with filtering 1300.

In some implementations, obtaining the first chroma prediction data includes decoding, reading, extracting, or otherwise obtaining, data indicating the number, count, or cardinality of non-linear terms from the encoded bitstream. Decoding, reading, extracting, or otherwise obtaining, the data indicating the number, count, or cardinality of non-linear terms from the encoded bitstream may include using variable length coding. In some implementations, a number, count, or cardinality, of bins may be context coded.

The third chroma prediction data is obtained (at 1360). Obtaining the third chroma prediction data (at 1360) includes obtaining, as a third chroma prediction value for the current chroma pixel for the current chroma component, a weighted average of the first chroma prediction value (P1) and the second chroma prediction value (P2). In some implementations, the wight applied to the first chroma prediction value (P1) to obtain the third chroma prediction data (at 1360) is zero (0) and the second chroma prediction value (P2) is used as the third chroma prediction value.

The decoded chroma pixel data is obtained (at 1362) for the current chroma pixel by decoding the current chroma pixel using the third chroma prediction value, such as by decoding a residual chroma pixel value and adding the third chroma prediction value to the residual chroma pixel value. The decoded chroma pixel data is included in the decoded block data for the current block. The decoded block data for the current block is included in decoded frame data for the current frame. Reconstructed frame data for the current frame is obtained using the decoded frame data.

Obtaining the current chroma pixel data for the current pixel from the current component data for the current block (at 1352), obtaining the first chroma prediction data (at 1354), obtaining the current luma prediction data (at 1356), obtaining the second chroma prediction data (at 1358), obtaining the third chroma prediction data (at 1360), and obtaining the decoded chroma pixel data (at 1362) may be performed on a per-pixel basis for the chroma pixels from the current chroma block for the current chroma component, as indicated by the broken directional line (at 1364) from obtaining the decoded chroma pixel data (at 1362) to obtaining the current chroma pixel data for a current pixel from the current component data for the current block (at 1352).

Obtaining the current component data for the current block (at 1350), obtaining the current chroma pixel data for the current pixel from the current component data for the current block (at 1352), obtaining the first chroma prediction data (at 1354), obtaining the current luma prediction data (at 1356), obtaining the second chroma prediction data (at 1358), obtaining the third chroma prediction data (at 1360), and obtaining the decoded chroma pixel data (at 1362) may be performed on a per-chroma-component basis for the current block, as indicated by the broken directional line (at

1370) from obtaining the decoded chroma pixel data (at 1362) to obtaining the current component data for the current block (at 1350).

Obtaining the current decoded block data (at 1330) may be performed on a per-block, or per coding unit, basis for the current frame, as indicated by the broken directional line (at 1380) from obtaining the decoded chroma pixel data (at 1362) to obtaining the current decoded block data (at 1330).

The reconstructed frame data is output (at 1340), such as presented, stored, or both.

In some implementations, one or more coding parameters for the current chroma block, such as the derived filter coefficients, the spatial intra prediction mode, or both, may be recorded, stored, or otherwise maintained, and may be used to decode one or more subsequent blocks. In some implementations, obtaining the first chroma prediction data (at 1354), obtaining the current luma prediction data (at 1356), and obtaining the second chroma prediction data (at 1358) may be omitted and obtaining the third chroma prediction data (at 1360) may include obtaining the third chroma prediction data by applying derived filter coefficients, previously obtained for coding a previously coded block, to the collocated luma pixel from the reconstructed luma block. In some implementations, obtaining the first chroma prediction data (at 1354) and obtaining the current luma prediction data (at 1356) include using a spatial intra prediction mode, previously used for coding a previously coded block, as the spatial intra prediction mode for the current block.

As used herein, the terms "optimal", "optimized", "optimization", or other forms thereof, are relative to a respective context and are not indicative of absolute theoretic optimization unless expressly specified herein.

As used herein, the term "set" indicates a distinguishable collection or grouping of zero or more distinct elements or members that may be represented as a one-dimensional array or vector, except as expressly described herein or otherwise clear from context.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and β, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

It will be appreciated that aspects can be implemented in any convenient form. For example, aspects may be implemented by appropriate computer programs which may be carried on appropriate carrier media which may be tangible carrier media (e.g., disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
generating encoded block data by encoding a current block from a current frame, wherein encoding the current block includes:
obtaining a first chroma prediction value for a current chroma pixel for a current chroma block of a current chroma component from the current block using a current spatial intra prediction mode other than a cross-component intra prediction mode;
obtaining a current luma prediction value for a current luma pixel collocated with the current chroma pixel using the current spatial intra prediction mode;
obtaining a second chroma prediction value for the current chroma pixel for the current chroma component by applying derived filter coefficients to the current luma prediction value;
obtaining, as a third chroma prediction value for the current chroma pixel for the current chroma component, a weighted average of the first chroma prediction value and the second chroma prediction value;
obtaining encoded chroma pixel data for the current chroma pixel by encoding the current chroma pixel using the third chroma prediction value; and
including the encoded chroma pixel data in the encoded block data;
including the encoded block data in an encoded bitstream; and
outputting the encoded bitstream.

2. The method of claim 1, wherein a partitioning decision for the current chroma block matches a partitioning decision for a current luma block for the current block.

3. The method of claim 2, wherein:
obtaining the first chroma prediction value using the current spatial intra prediction mode includes using, as the current spatial intra prediction mode, a spatial intra prediction mode previously used to obtain a reconstructed luma block corresponding to the current luma block.

4. The method of claim 3, wherein:
obtaining the current luma prediction value includes using, as the current luma prediction value, a luma prediction value obtained from a luma pixel collocated with the current chroma pixel obtained by obtaining the reconstructed luma block.

5. The method of claim 4, wherein:

including the encoded block data in the encoded bitstream includes including data indicating that obtaining the current luma prediction value includes using, as the current luma prediction value, the luma prediction value obtained from the luma pixel collocated with the current chroma pixel obtained by obtaining the reconstructed luma block.

6. The method of claim 2, wherein:

including data indicating the current spatial intra prediction mode in the encoded bitstream is omitted.

7. The method of claim 1, wherein a partitioning decision for the current chroma block differs from a partitioning decision for a current luma block for the current block.

8. The method of claim 7, wherein:

including the encoded block data in the encoded bitstream includes including data indicating the current spatial intra prediction mode in the encoded bitstream.

9. The method of claim 7, wherein:

obtaining the current luma prediction value includes obtaining the current luma prediction value using the current spatial intra prediction mode.

10. The method of claim 9, wherein:

including the encoded block data in the encoded bitstream includes including, in the encoded bitstream, data indicating that obtaining the current luma prediction value includes obtaining the current luma prediction value using the current spatial intra prediction mode.

11. The method of claim 7, wherein:

obtaining the first chroma prediction value using the current spatial intra prediction mode includes using, as the current spatial intra prediction mode, a defined spatial intra prediction mode.

12. The method of claim 7, wherein:

including data indicating the current spatial intra prediction mode in the encoded bitstream is omitted.

13. The method of claim 1, wherein:

obtaining the current luma prediction value includes obtaining a downsampled luma prediction block for the current block.

14. The method of claim 1, wherein:

applying the derived filter coefficients includes obtaining the derived filter coefficients.

15. The method of claim 14, wherein:

obtaining the derived filter coefficients includes obtaining the derived filter coefficients in accordance with a filter shape.

16. The method of claim 15, wherein:

including the encoded block data in the encoded bitstream includes including, in the encoded bitstream, data indicating the filter shape.

17. The method of claim 15, wherein:

obtaining the derived filter coefficients includes using a bias parameter.

18. The method of claim 17, wherein:

including the encoded block data in the encoded bitstream includes including, in the encoded bitstream, the bias parameter.

19. A method comprising:

generating decoded block data by decoding a current block from a current frame from an encoded bitstream, wherein decoding the current block includes:

obtaining a first chroma prediction value for a current chroma pixel for a current chroma component from the current block using a current spatial intra prediction mode other than a cross-component intra prediction mode;

obtaining a current luma prediction value for a current luma pixel collocated with the current chroma pixel using the current spatial intra prediction mode;

obtaining a second chroma prediction value for the current chroma pixel for the current chroma component by applying derived filter coefficients to the current luma prediction value;

obtaining, as a third chroma prediction value for the current chroma pixel for the current chroma component, a weighted average of the first chroma prediction value and the second chroma prediction value;

obtaining decoded chroma pixel data for the current chroma pixel by decoding the current chroma pixel using the third chroma prediction value; and including the decoded chroma pixel data in the decoded block data;

including the decoded block data in decoded frame data for the current frame;

obtaining reconstructed frame data for the current frame using the decoded frame data; and outputting the reconstructed frame data.

20. An apparatus for encoding using chroma intra prediction with filtering comprising:

a non-transitory computer readable medium; and a processor configured to execute instructions stored on the non-transitory computer readable medium to:

generate encoded block data, wherein, to generate the encoded block data, the processor executes the instructions to encode a current block from a current frame, wherein to encode the current block the processor executes the instructions to:

obtain a first chroma prediction value for a current chroma pixel for a current chroma block of a current chroma component from the current block in accordance with a current spatial intra prediction mode other than a cross-component intra prediction mode;

obtain a current luma prediction value for a current luma pixel collocated with the current chroma pixel using the current spatial intra prediction mode;

obtain a second chroma prediction value for the current chroma pixel for the current chroma component, wherein, to obtain the second chroma prediction value, the processor executes the instructions to apply derived filter coefficients to the current luma prediction value;

obtain, as a third chroma prediction value for the current chroma pixel for the current chroma component, a weighted average of the first chroma prediction value and the second chroma prediction value;

obtain encoded chroma pixel data for the current chroma pixel, wherein, to obtain the encoded chroma pixel data, the processor executes the instructions to encode the current chroma pixel using the third chroma prediction value; and include the encoded chroma pixel data in the encoded block data;

include the encoded block data in an encoded bitstream; and output the encoded bitstream.

* * * * *